US007174461B2

(12) United States Patent
Nagata et al.

(10) Patent No.: US 7,174,461 B2
(45) Date of Patent: Feb. 6, 2007

(54) INFORMATION PROVIDING SYSTEM, APPARATUS AND METHOD, AND PROGRAM STORING MEDIUM (75) Inventors: Minoru Nagata, Kanagawa (JP); Motohiro Ohama, Kanagawa (JP)

(73) Assignee: Sony Corporation, Tokyo (JP)

( * ) Notice: Subject to any disclaimer, the term of this patent is extended or adjusted under 35 U.S.C. 154(b) by 758 days.

(21) Appl. No.: 09/875,425

(22) Filed: Jun. 5, 2001

(65) Prior Publication Data
US 2002/0016927 A1 Feb. 7, 2002

(30) Foreign Application Priority Data
Jun. 6, 2000 (JP) ............... 2000-169280

(51) Int. Cl.
*H04L 12/22* (2006.01)
(52) U.S. Cl. ............... 713/182; 713/168; 713/170; 713/185; 726/4; 726/7; 726/9; 709/217; 709/229; 709/238; 709/245
(58) Field of Classification Search ........ 713/201; 709/219
See application file for complete search history.

(56) References Cited

U.S. PATENT DOCUMENTS

| 5,727,156 | A  | * | 3/1998 | Herr-Hoyman et al. ..... 709/219 |
| 5,872,915 | A  | * | 2/1999 | Dykes et al. ............... 713/202 |
| 5,875,296 | A  | * | 2/1999 | Shi et al. .................... 713/202 |
| 6,092,053 | A  | * | 7/2000 | Boesch et al. ................ 705/26 |
| 6,389,460 | B1 | * | 5/2002 | Stewart et al. ............... 709/217 |
| 6,587,836 | B1 | * | 7/2003 | Ahlberg et al. ............... 705/26 |
| 6,785,705 | B1 | * | 8/2004 | Kocherlakota ............... 709/203 |
| 2005/0044423 | A1 | * | 2/2005 | Mellmer et al. ............. 713/201 |

OTHER PUBLICATIONS

Anderson, S., et al., 'Web Services Trust Language (WS-Trust) Version 1.1', OpenNetwork Technologies, inc., et al, May 2004, entire document, http://specs.xmlsoap.org/ws/2005/02/trust/WS-Trust.pdf#search=%22web%20%22anonymous%20request%22%20-encryption%20delegated%20security%22.*
Spring, T., 'Will Anonymous E-Mail Become a Casualty of War?', PCWorld.com, Feb. 11, 2002, entire article, http://www.pcworld.com/article/id, 83564-page, 1/article.html.*

* cited by examiner

*Primary Examiner*—Nasser Moazzami
*Assistant Examiner*—Ronald Baum
(74) *Attorney, Agent, or Firm*—Oblon, Spivak, McClelland, Maier & Neustadt, P.C.

(57) ABSTRACT

An information providing system, an information providing apparatus, an information providing method, and a program storing medium makes it possible to always provide provision information suitable for personal user information about a user regardless a user's terminal the user uses. Provided are a user identifying means 12 for identifying a user, a user information taking-out means 13 for taking out personal user information about the identified user from a user information storage means 16, a control information creating means 14 for creating control information based on the taken-out user information, and a provision information supplying means 22 for creating provision information suitable for the personal user information on the basis of the control information and supplying it to the user.

11 Claims, 8 Drawing Sheets

(A) USER INFORMATION TABLE  100

| USER ID | PASSWORD | NAME | PRONUNCIATION OF NAME | ADDRESS | BIRTH | SEX | HOBBY 1 | HOBBY 2 |
|---|---|---|---|---|---|---|---|---|
| 0001 | Pass1 | 山田一郎 | YAMADA ICHIRO (ヤマダ イチロウ) | CHIBA··· | 19XX/XX/XX | M | HORSE RACE | MAH-JONGG |
| 0002 | Pass2 | 吉田次郎 | YOSHIDA JIRO (ヨシダ ジロウ) | TOKYO··· | 19XX/XX/XX | M | READING | MOVIE |
| 0003 | Pass3 | 田中花子 | TANAKA HANAKO (タナカ ハナコ) | HOKKAIDOU··· | 19XX/XX/XX | F | HIKING | SWIMMING |

(B) USER IDENTIFICATION TABLE  101

| USER ID | PASSWORD |
|---|---|
| 0001 | Pass1 |
| 0002 | Pass2 |
| 0003 | Pass3 |

INFORMATION PROVIDING SYSTEM, APPARATUS AND METHOD, AND PROGRAM STORING MEDIUM

BACKGROUND OF THE INVENTION

1. Field of the Invention

This invention relates to an information providing system, an information providing apparatus, an information providing method, and a program storing medium, and more particularly, is suitably applied to an information providing system in which information is provided over a network.

2. Description of the Related Art

Webs (that is, WWW: World Wide Web) which are information networks which relates various information of web servers separately existing on a network to each other so as to search are widely used as an information providing service on the network such as the Internet.

A user's terminal connected to such a network transmits a request for taking out desired information (that is, a web page), to a web server on the basis of a predetermined protocol, using a web browser which is viewing software for webs.

Then, the web server returns web page data in response to the taking-out request, which is transmitted from the user's terminal, based on the predetermined communication protocol, so as to display the web page, which is desired by the user, on the user's terminal.

By the way, out of such web servers, some web servers create and transmit web page data having the contents suitable for each user, on the basis of personal information of a user (hereinafter, referred to as user information) inputted with the user's terminal.

This user information includes an address, a name, a handle name (a fictitious name used for the Internet), and hobbies.

The web server extracts information suitable for, for example, the user's hobbies from an enormous amount of information possessed by the server, based on the user information, so that web pages having the contents suitable for the user's hobbies can be provided.

Then the web server files the inputted user information in an information file called a cookie, and stores the cookie in the user's terminal.

The user's terminal transmits the cookie together with the taking-out request to the web server when accessing the web server again.

Then, the web server creates web page data based on the cookie added to the taking-out request, which can effectively utilize the user information inputted once, again and again.

Here, when a user accesses the web server with his terminal in his house and inputs user information, the web server stores a cookie for the user in his terminal in his house.

Therefore, if the user in his office tries to access the web server using his terminal installed in his office, the web server can not get his cookie since his cookie is stored in his terminal in his house. As a result, web page data suitable for the user information can not be provided.

As described above, such a web server makes a user's terminal store user information as a cookie, which causes a problem that the web server can not provide web page data based on the user's cookie when the user accesses the web server using user's another terminal different from that used when inputting the user information, because user's another terminal does not store the cookie for the user.

SUMMARY OF THE INVENTION

In view of the foregoing, an object of this invention is to provide an information providing system, an information providing apparatus, an information providing method, and a program storing medium which are capable of always providing information suitable for user information, regardless of user's terminals used by a user.

The foregoing object and other objects of the invention have been achieved by the provision of an information providing system comprising a user identifying device and an information providing apparatus, in which the user identifying device comprises: a user identifying means for identifying a user himself based on a password inputted with a user terminal; a user information taking-out means for taking out personal user information about the user identified by the user identifying means, from prescribed user information storage means; and a control information creating means for creating control information based on the user information taken out by the user information taking-out means, and the information providing apparatus comprises a provision information supplying means for creating provision information having the contents corresponding to the personal user information about the user based on the control information and supplying it to the user's terminal.

Further, the present invention provides an information providing system comprising a user identifying device, a control information creating device and an information providing apparatus, in which the user identifying device comprises: a user identifying means for identifying a user himself based on a password inputted with a user terminal; and a user information taking-out means for taking out personal user information about the user identified by the user identifying means, from prescribed user information storage means, the control information creating device comprises a control information creating means for creating control information based on the user information taken out by the user information taking-out means, and the information providing apparatus comprises a provision information supplying means for creating provision information having the contents corresponding to the personal user information of the user based on the control information and supplying it to the user terminal.

Furthermore, the present invention provides an information providing apparatus comprising a user identifying means for identifying a user himself based on a password inputted with a user terminal; a user information taking-out means for taking out personal user information about the user identified by the user identifying means from prescribed user information storage means; a control information creating means for creating control information based on the user information taken out by the user information taking-out means; and a provision information supplying means for creating provision information having the contents corresponding to the personal user information of the user based on the control information and supplying it to a prescribed user's terminal.

Furthermore, the present invention provides an information providing method comprising: a user identifying step of identifying a user himself; a user information taking-out step of taking out personal user information about the user identified, from prescribed user information storage means; a control information creating step of creating control information based on the user information taken out by the user information taking-out step; and a provision information supplying step of creating provision information having the contents corresponding to the personal user information of the user based on the control information and supplying it to a prescribed user's terminal.

Furthermore, the present invention provides a program storage means for making an information processing apparatus execute a program, in which the program comprises: a user identifying step of identifying a user himself; a user information taking-out step of taking out personal user information about the user identified, from prescribed user information storage means; a control information creating step of creating control information based on the user information taken out by the user information taking-out means; and a provision information supplying step of creating provision information having the contents corresponding to the personal user information of the user based on the control information and supplying it to a prescribed user's terminal.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be descried with reference to the accompanying drawings:

(1) First Embodiment

Figure 1:
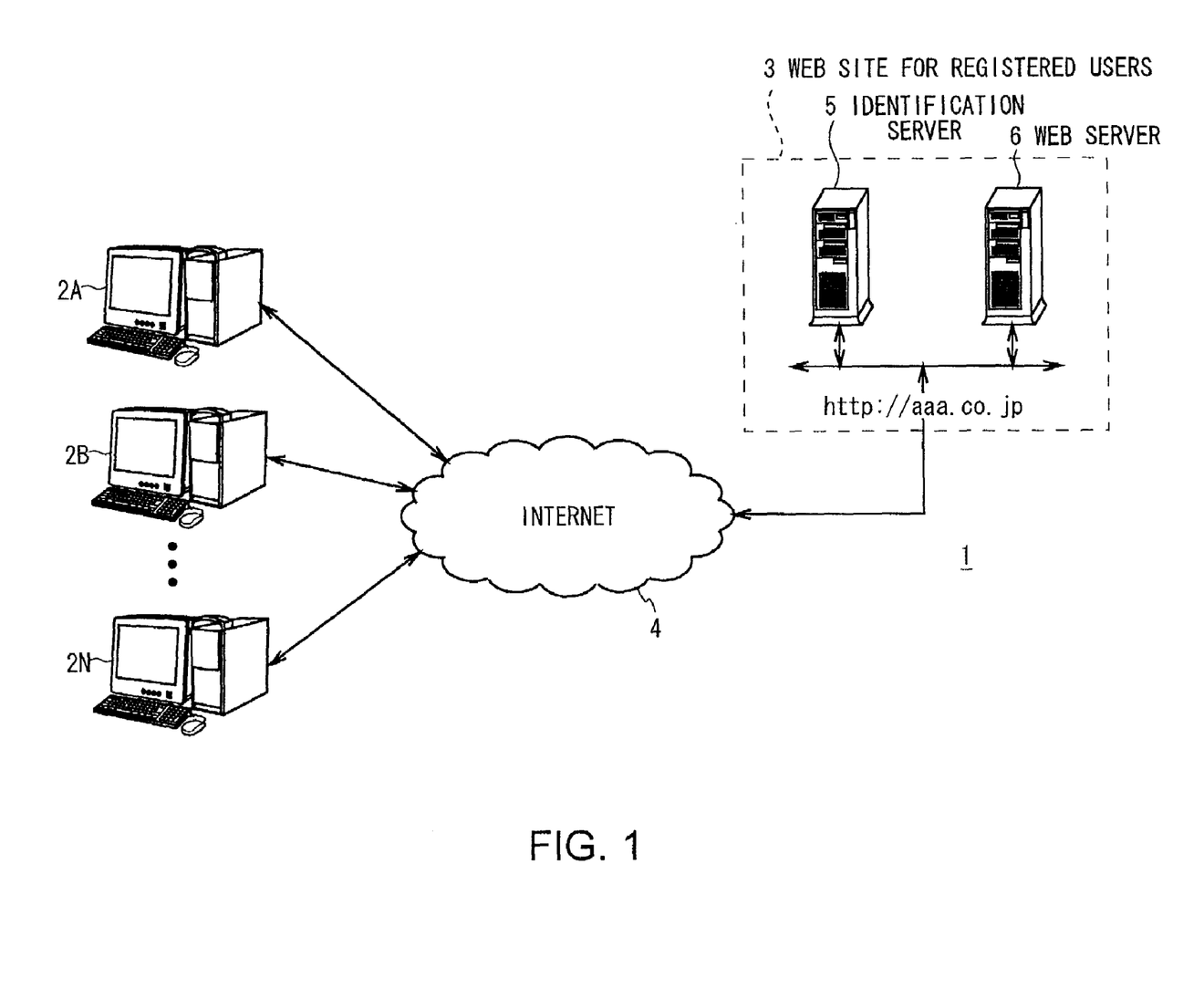
FIG. 1 is a block diagram showing the whole configuration of an information providing system in a first embodiment of the present invention.

In FIG. 1, a reference numeral 1 shows an information providing system in the first embodiment and is so constructed that a plurality of users' terminals 2A to 2N and a web site for registered users 3 are connected to the Internet 4.

In the web site for registered users 3, an identification server 5 for identifying members (hereinafter, referred to as registered users) who has registered in the information providing system 1, and a web server 6 for providing web pages for the registered users are connected to the Internet 4 via a gate way server (not shown). The web server 6 customizes the web pages for registered users based on a cookie supplied from the identification server 5 to supply them to any of the users' terminals 2A to 2N, so that information suitable for the registered user's hobbies can be provided. This web site for registered users 3 is given the domain name "http://aaa.co.jp".

Both the identification server 5 and the web server 6 are general server computers and each includes a central processing unit (CPU) for controlling the whole operations of the server computer, a hard disk drive storing various programs and data, and a random access memory (RAM), so that the CPU takes out programs from the hard disk drive and loads and executes them on the RAM so as to carry out various functions.

In addition, the users' terminals 2A to 2N are general desktop computers or notebook computers, and each includes the CPU for controlling the whole operations of the user's terminal 2A to 2N, a hard disk drive, a RAM, and a display, so that the CPU takes out programs from the hard disk drive, loads and executes them on the RAM so as to carry out various functions. Each user's terminal 2A to 2N can communicate data back and fourth with various servers such as the identification server 5 and the web server 6 and another user's terminal 2 over the Internet, and can display received data on the display.

Figure 2:
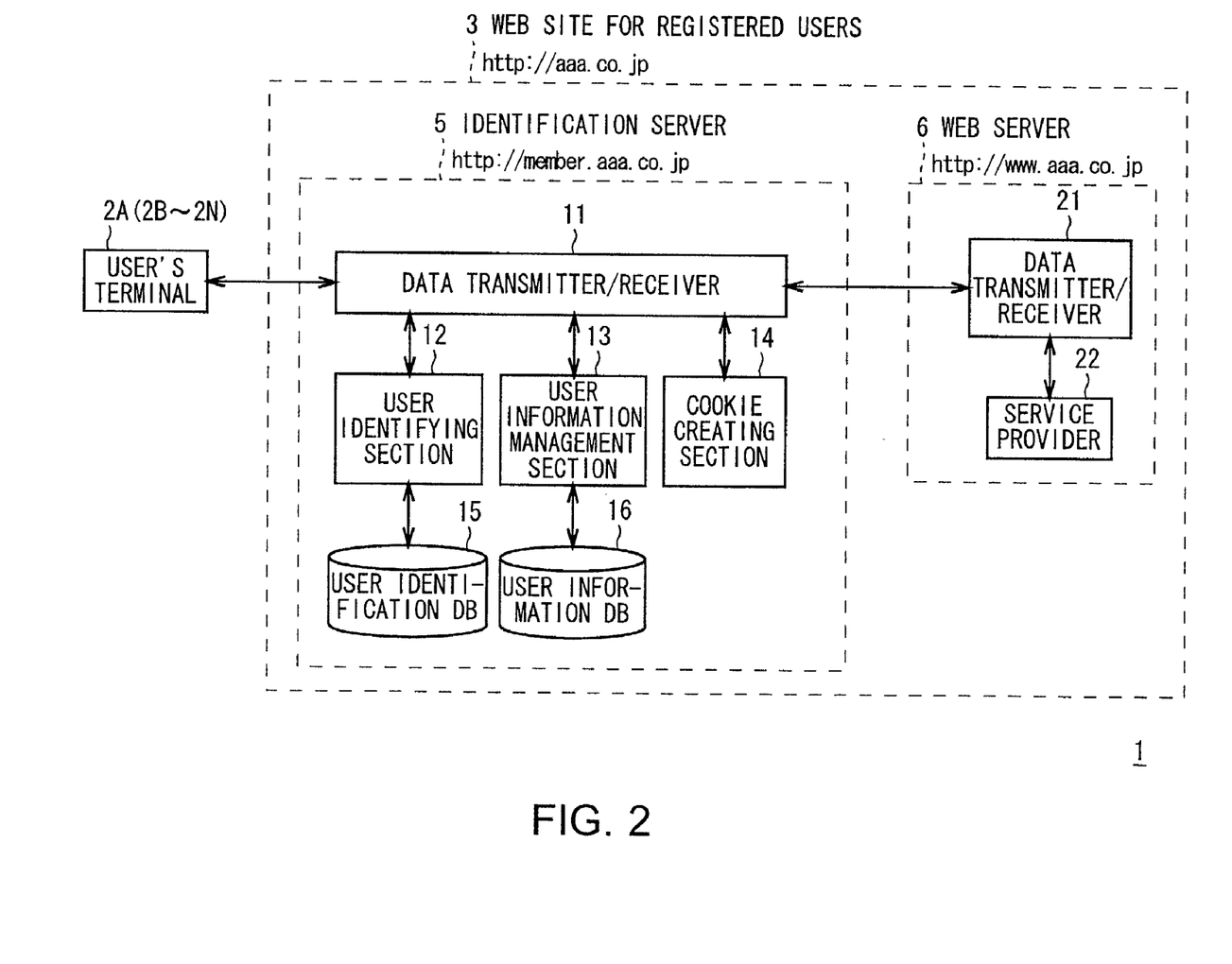
FIG. 2 is a function block diagram showing the structure of the information providing system in the first embodiment.

FIG. 2 shows the information providing system 1 in the form of the function blocks. The identification server 5 is composed of various function blocks including a data transmitter/receiver 11, a user identifying section 12 as a user identifying means, a user information management section 13 as a user information taking-out means, a cookie creating section 14 as a control information creating means, an identified user database 15, and a user information database 16 as a user information storage means.

The data transmitter/receiver 11, the user identifying section 12 and the user information management section 13 are all programs which the CPU executes on the RAM. The identified user database 15 and the user information database 16 are databases which are stored in the hard disk drive. The user identifying section 12, the user information management section 13 and the cookie creating section 14 communicate data back and fourth with other servers and the users' terminals 2A to 2N via the data transmitter/receiver 11.

Further, the web server 6 is composed of a data transmitter/receiver 21 and a service providing section 22 as a provision information supplying means. Both of them are programs which the CPU of the web server 6 executes on the RAM, and the service providing section 21 communicate data back and fourth with other servers and the users' terminals 2A to 2N via the data transmitter/receiver 21.

Figure 3:
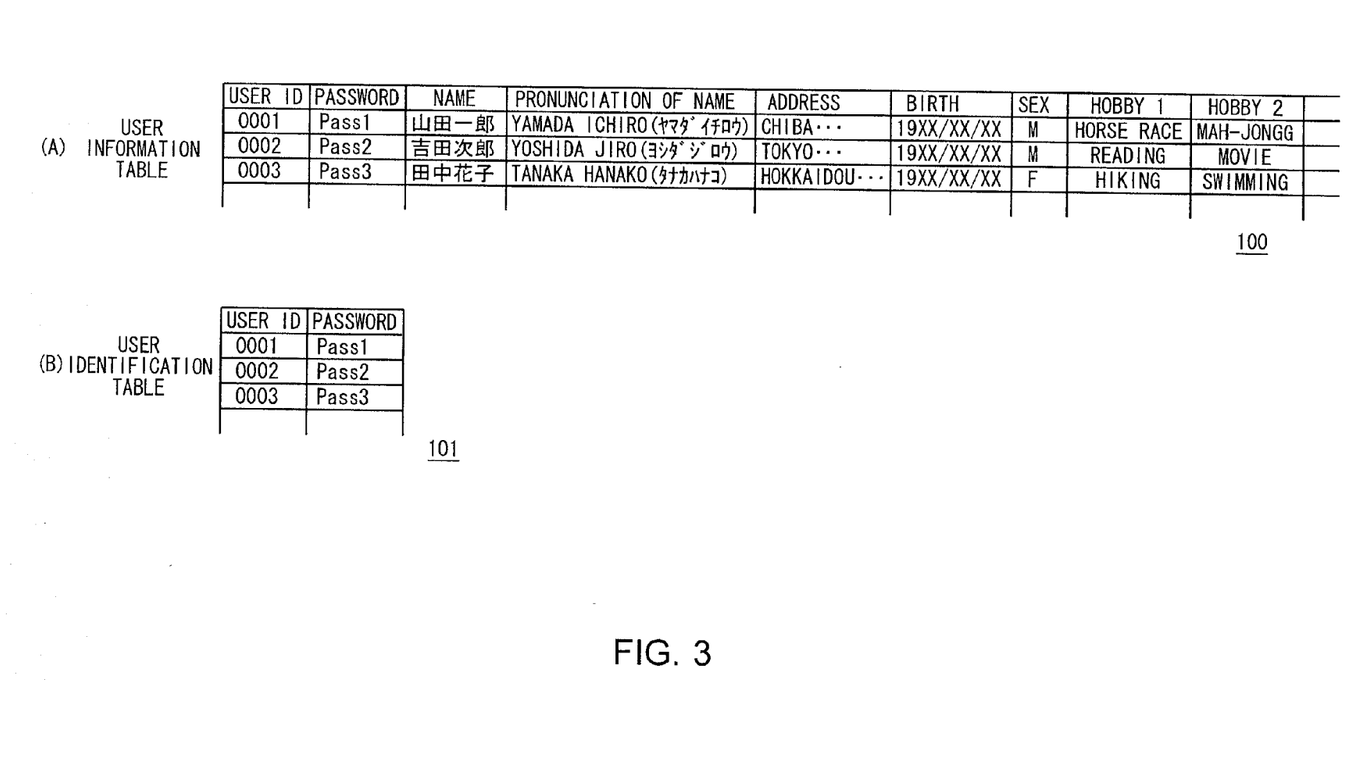
FIGS. 3A and 3B are tables showing the structures of a user information table and a user identification table.

When a user applies to the information providing system 1, he inputs various personal data including his own name, address, birth date, sex, hobbies (referred to as user information) with his terminal 2A (2B to 2N). The user information management section 13 of the identification server 5 collects user information on all registered users to create a user information table 100 shown in FIG. 3A, and stores this in the user information database 16.

Note that, the user information can be updated by using a user information updating page (not shown) supplied from the identification server 5. As a result, a registered user can change the user information in accordance with a change in his address or hobbies.

When the registered user accesses the web server 6 with the user's terminal 2A (2B to 2N), the identification server 5 takes out the user information about the registered user from the user information database 16 accordingly, creates a cookie as control information on the basis of the usr information and supplies it to the web server 6. Then, the web server 6 customizes the web pages for registered users and supplies them to the user's terminal 2A (2B to 2N).

Therefore, in the information providing system 1 in the present invention, a registered user can see the web pages for registered users customized based on his own user information, using any user's terminal 2A to 2N.

Next, aforementioned processing in the information providing system 1 will be described in detail using the flowchart shown in FIG. 4.

Figure 4:
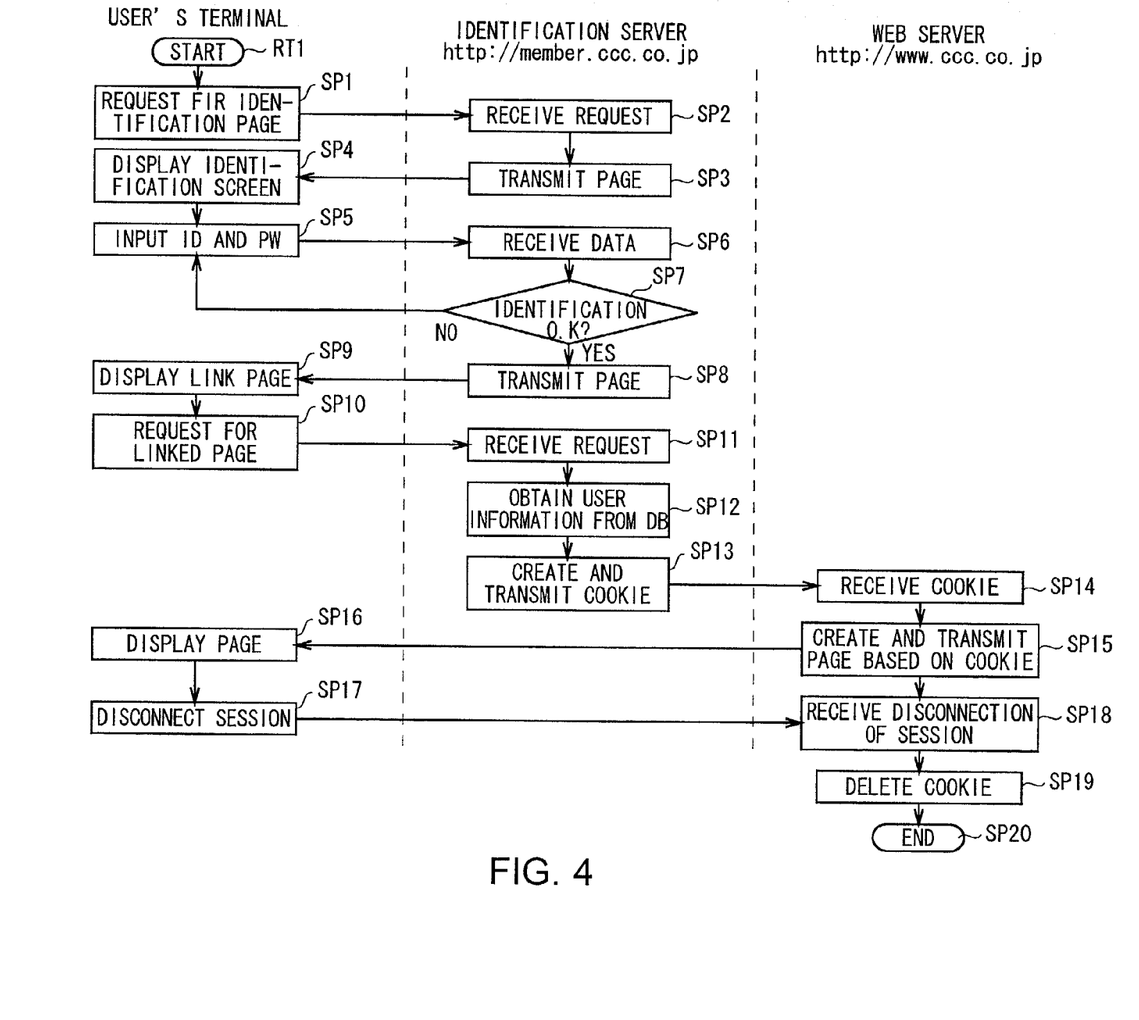
FIG. 4 is a flowchart showing an information providing processing procedure in the first embodiment.

That is, in FIG. 4, in the information providing system 1, the routine RT starts at starting step, and at step SP1, when the user inputs the access request to the registered user identification page in the information providing system 1, the CPU of the user terminal 2A transmits a request for taking out the registered user identification page to the identification server 5 accordingly.

At step SP2, when the user identifying section 12 of the identification server 5 receives the request for taking out the registered user identification page, the process moves to next step SP3.

At step SP3, the user identifying section 12 of the identification server 5 takes out hypertext markup language (HTML) data of the registered user identification page from the hard disk drive (not shown) of the identification server 5 and transmits this to the user's terminal 2A.

At step SP4, when the CPU of the user's terminal 2A receives the HTML data of the registered user identification page, which is transmitted from the identification server 5, it displays a registered user identification screen 200 (FIG. 5) based on the HTML data on a display and moves to next step SP5.

Figure 5:
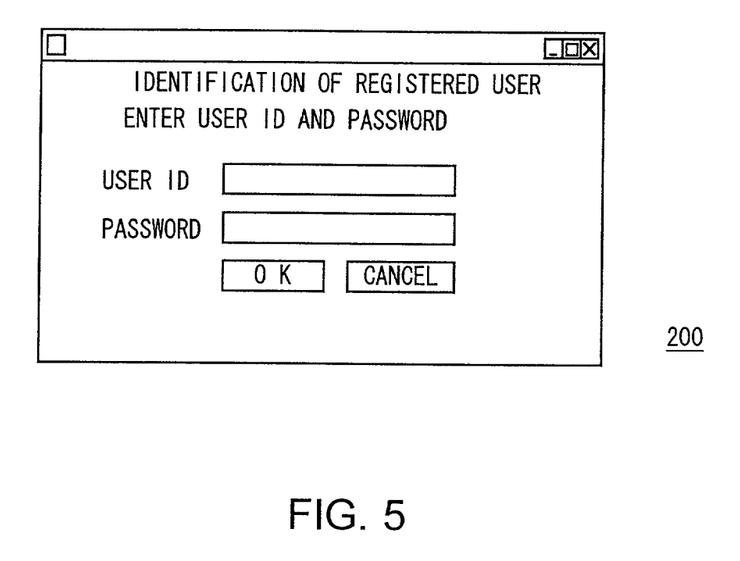
FIG. 5 is a schematic illustration showing a registered user identification screen.

At step SP5, when the user inputs the user ID and password on the registered user identification screen 200, the CPU of the user's terminal 2A transmits the inputted user ID and password to the identification server 5.

At step SP6, when the user identifying section 12 of the identification server 5 receives the user ID and password, which are transmitted from the user's terminal 2A, the processing moves to next step SP7.

At step SP7, the user identifying section 12 of the identification server 5 compares the user ID and password transmitted from the user's terminal 2A with the user ID and password written in the user identification table 101 (FIG. 3B) in the identified user database 15, to judge whether or not the access from the user's terminal 2A is made by a registered user.

Obtaining the negative result at step 7 means that the user ID and password transmitted from the user's terminal 2A does not match the user ID and password written in the user identification table 100, that is, the access from the user's terminal 2A is not made by a registered user. Then, the user identifying section 12 of the identification server 5 transmits a request for inputting the user ID and password again to the user's terminal 2A. When the CPU of the user's terminal 2A receives the re-input request, it returns to step SP5 and transmits the re-inputted usr ID and password to the identification server 5.

On the contrary, obtaining the affirmative result at step SP7 means that the user ID and password transmitted from the user's terminal 2A match the user ID and password written in the user identification table 100, that is, the access from the user terminal 2A is made by a registered user. Then, the user identifying section 12 of the identification server 5 moves to next step SP8.

At step SP8, the user identifying section 12 of the identification server 5 takes out HTML data of the link page for registered users which is a link page to web pages for registered users which are provided by the web site for registered users 4, and transmits it to the user's terminal 2A via the data transmitter/receiver 11.

At step SP9, when the CPU of the user's terminal 2 receives the HTML data of the link page for registered users transmitted from the identification server 5, it displays the link screen for registered users 201 based on the HTML data on the display, and moves to next step SP10.

Figure 6:
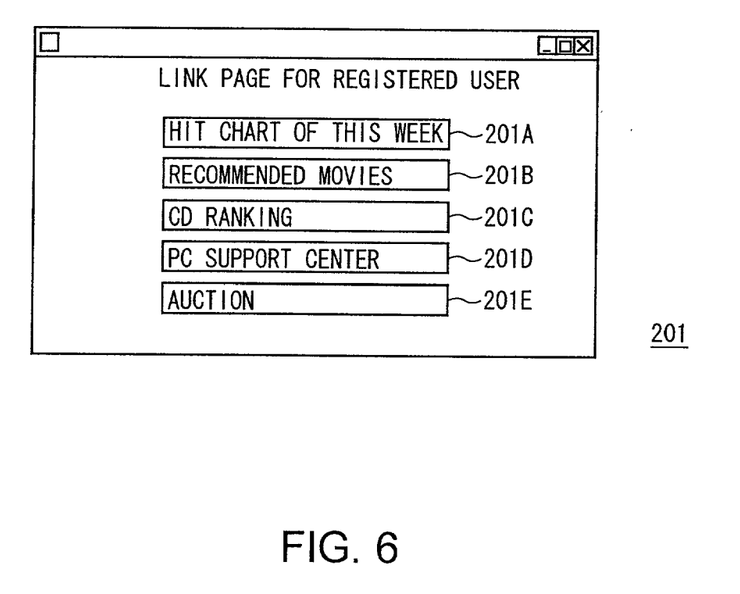
FIG. 6 is a schematic illustration showing a link screen for registered users.

FIG. 6 shows the link screen for registered users 201, and has linked item display areas 201A to 201E which are related with the web pages for registered users provided by the web server 6 (that is, hyper link).

At step SP10, when the user clicks any of the linked item display areas 201A to 201E with the mouse, the CPU of the user's terminal 2A transmits a request for taking out a linked web page (that is, web page for registered users) corresponding to the linked item display area clicked, to the identification server 7.

At step SP11, when the user information management section 13 of the identification server 5 receives the request for taking out the linked web page transmitted from the user's terminal 2A, the process moves to next step SP12.

At step SP12, the user information management section 13 of the identification server 5 takes out the user information about the registered user who has transmitted the taking-out request, from the user information table 100 in the user information database 16, based on the user ID of the registered user, and supplies it to the cookie creating section 14. Then, the process moves to next step SP13.

At step SP13, the cookie creating section 14 of the identification server 7 creates a cookie based on the user information, which is supplied from the user information management section 13, and transmits this together with the taking-out request to the web server 6.

At step SP14, when the service providing section 22 of the web server 6 receives the cookie and the taking-out request transmitted from the identification server 5, the process moves to next step SP15.

At step SP15, the service providing section 22 of the web server 6 creates HTML data of a web page for registered users suitable for the user's hobbies, on the basis of the received cookie (that is, customizes the web page), and transmits it to the user's terminal 2A.

At step SP16, when the CPU of the user's terminal 2A receives the HTML data of the web page for registered users, which are transmitted from the web server 6, displays the screen of the web page for registered users on the display and the process moves to next step SP17.

At step SP17, when the user finishes the web browser program, the CPU of the user's terminal 2A transmits a session disconnect request to the web server 6 accordingly.

At step SP18, when the service providing section 22 of the web server 6 receives the session disconnect request transmitted from the user's terminal 2A, the process moves to next step SP19.

At step SP19, the service providing section 22 of the web server 6 deletes the cookie transmitted from the cookie creating server, and the process moves to next step SP20 where the processing is terminated.

As described above, in the information providing system 1, the identification server 5 creates and supplies a cookie based on user information about a registered user to the web server 6. Then, the web server 6 customizes a web page for registered users based on the cookie supplied from the identification server 5 and supplies it to the user's terminal 2A.

In the aforementioned configuration, the identification server 5 identifies a user who has accessed using the user's terminal 2A. If the access is made by a registered user, then the identification server 5 supplies a link page for registered users which is a link page to web pages for registered users provided by the web site for registered users 4, to the user's terminal 2A.

Then, when the identification server 5 receives the request for taking out the web page for registered users from the user's terminal 2A, it creates a cookie based on the user information about the registered user, and transmits it together with the taking-out request to the web server 6.

The web server 6 customizes a web page for registered users suitable for the user's hobbies on the basis of the cookie transmitted from the identification server 5, and transmits it to the user's terminal 2A.

Thus, in the information providing system 1, a web page for registered users suitable for registered user's hobbies can be customized using a cookie which is created based on user information by the identification server 5 and can be provided.

Here, a general web server stores various setting information (user information) inputted by a user on a web page supplied from the web server, as a cookie in a user's terminal, and when access is made from the user's terminal again, the web server customizes and provides a web page based on the cookie stored in the user's terminal.

Therefore, in the case where a user accesses a general web server using another user's terminal, the cookie can not be utilized because it is not stored in another user's terminal. As a result, the user information can be effectively utilized.

On the contrary, in the information providing system 1 of this invention, the user information about each registered user is stored in the user information database 16, and the cookie creating section 14 creates a cookie based on the user information and supplies it to the web server 6. As a result, the registered user can see a web page for registered users customized according to his own user information, by using any of the users' terminals 2A to 2N.

In addition, in the information providing system 1, even when the registered user accesses by using a user's terminal 2B to 2N possessed by another person or a user's terminal 2B to 2N shared in his office, he can surely see a web page for registered user customized according to his own user information, by using the cookie created by the cookie creating section 14.

According to the aforementioned configuration, user information about each registered user is stored in the user information database 16, a cookie is created based on the user information and is supplied to the web server 6, so that the user can always see a web page for registered users customized according to his own user information, regardless of a user's terminal 2A to 2N which the user uses.

(2) Second Embodiment

Figure 7:
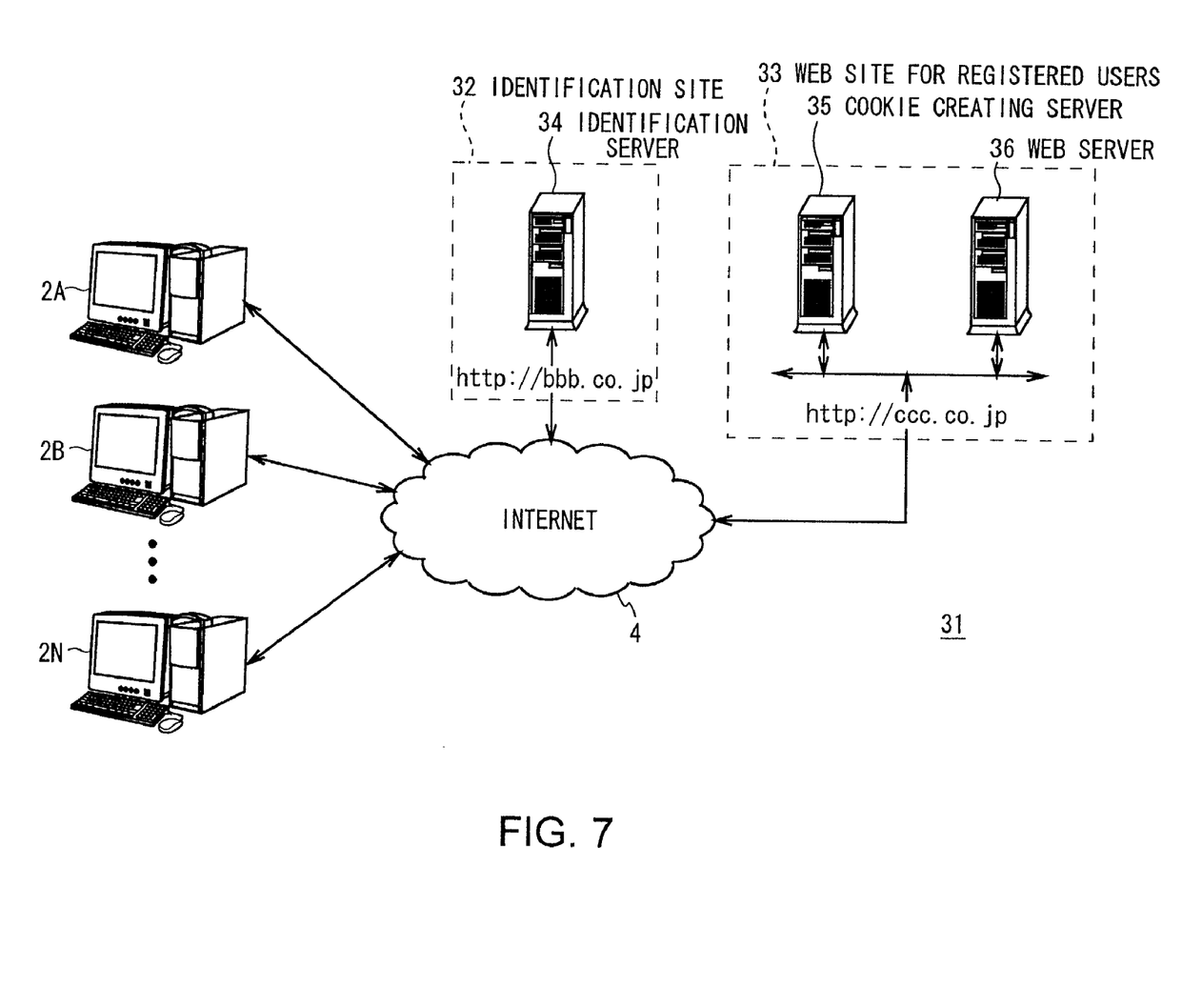
FIG. 7 is a block diagram showing the whole configuration of an information providing system in a second embodiment of the present invention.

In FIG. 7 in which the same reference numerals are applied to parts corresponding to those in FIG. 1, a reference numeral 31 is an information providing system in the second embodiment as a whole and is so constructed that a plurality of users' terminals 2A to 2N, an identification site 32 and a web site for registered users 33 are connected to the Internet 4.

In the identification site 32, an identification server 34 for identifying users registered in the information providing system 31 is connected to the Internet 4 via a gate way server (not shown). This identification site 32 is given the domain name "http://bbb.co.jp".

In the web site 33 for registered users 33, a cookie creating server 35 for creating a cookie based on user information supplied from the identification server 34 and a web server 36 for providing pages for registered users are connected to the Internet 4 via a gate way server not shown. The web server 36 customizes and supplies a page for registered users based on the cookie supplied from the cookie creating server 35 to any of the user terminals 2A to 2N, so as to provide information suitable for the registered users' hobbies. This web site for registered users 33 is given the domain name "http://ccc.co.jp.

Here, in the information providing system 1 (FIG. 1) of the first embodiment, the identification server 5 and the web server 6 are provided in the same domain. On the other hand, the information providing system 31 of the second embodiment, the identification server 34 and the web server 36 are provided in the separate domains.

The identification server 34, the cookie creating server 35 and the web server 35 are all general server computers, and each includes a central processing unit (CPU) for controlling the whole operations of the server computer, a hard disk drive storing various programs and data, and a random access memory (RAM). And the CPU carries out various functions by reading out programs from the hard disk drive and loading and executing them on the RAM.

Figure 8:
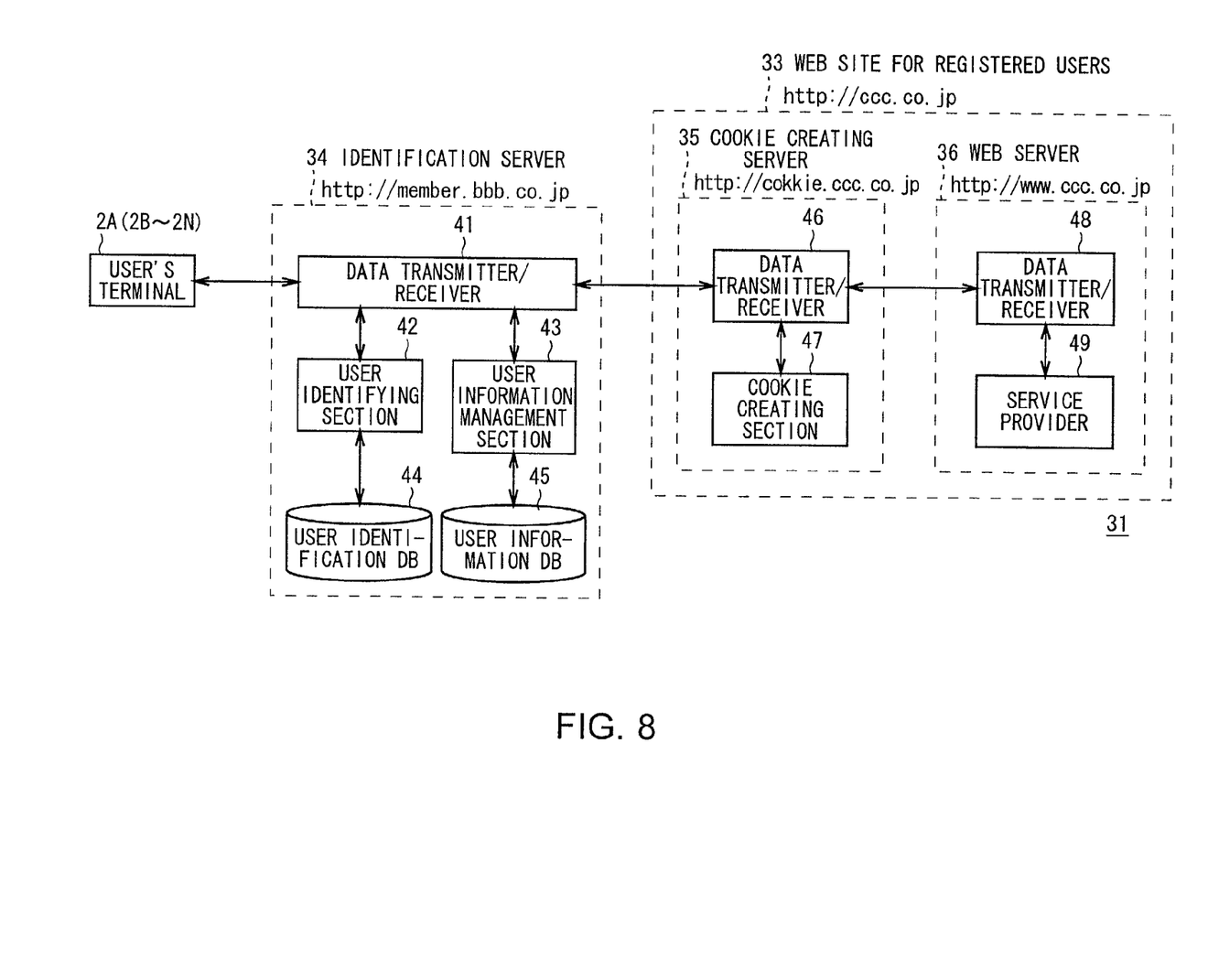
FIG. 8 is a function block diagram showing the information providing system in the second embodiment.

On the other hand, FIG. 8 shows the information providing system 31 in the form of function blocks, and the identification server 34 includes the following function blocks: a data transmitter/receiver 41, a user identifying section 42 as a user identifying means, a user information management section 43 as a user information taking-out means, a user identification database 44, and a user information database 45 as a user information storage means.

The data transmitter/receiver 41, the user identifying section 42, and the user information management section 43 are all programs executed on the RAM by the CPU, and the user identification database 44 and the user information database 45 are both databases stored in the hard disk drive. The user identifying section 42 and the user information management section 43 communicate data back and fourth with another server or a user's terminal 2A to 2N via the data transmitter/receiver 41.

In addition, the cookie creating server 35 includes a data transmitter/receiver 46 and a cookie creating section 47 as a control information creating means. And the web server 36 includes a data transmitter/receiver 48 and a service providing section 49 as a provision information supplying means.

These are both programs to be executed on the RAM by the CPU of the cookie creating server 35 or the web server 36. The cookie creating section 47 and the service providing section 49 communicate data back and fourth with another server or a user's terminal 2A to 2N via the data transmitter/receiver 46 and the data transmitter/receiver 48, respectively.

A registered user of the information providing system 31 inputs personal data (referred to as user information) such as his own name, address, birth, sex, and hobbies, using the user's terminal 2A (2B to 2N) when applying to the information providing system 31. The user information management section 43 of the identification server 34 collects user information of all registered users to create a user information table 100 (FIG. 3A) and stores it in the user information database 45.

Note that, the user information can be updated via the user information updating page (not shown) supplied from the identification server 34, so that the registered users can change the user information according to the change in the personal information such as address, new hobbies.

When the registered user accesses the web server 36 with the user terminal 2A (2B to 2N), the identification server 34 takes out the user information about the registered user from the user information database 45 accordingly, and transmits it to the cookie creating server 35.

The cookie creating sever 35 creates a cookie as control information based on the received user information and supplies it to the web server 36. Then, the web sever 36 customizes a web page for registered users based on the cookie supplied from the cookie creating server 35 and supplies it to the user's terminal 2A (2B to 2N).

Thereby, in the information providing system 31 of the present invention, even the identification server 34 and the web server 36 are belonged to separate domains, the cookie creating sever 35 creates a cookie base on user information and supplies it to the web server 36, so that the registered user can see web pages for registered users customized based on his own user information, even using any user's terminal 2A (2B to 2N).

Next, the aforementioned processing by the information providing system 31 will be explained with reference to the flowchart shown in FIG. 9.

Figure 9:
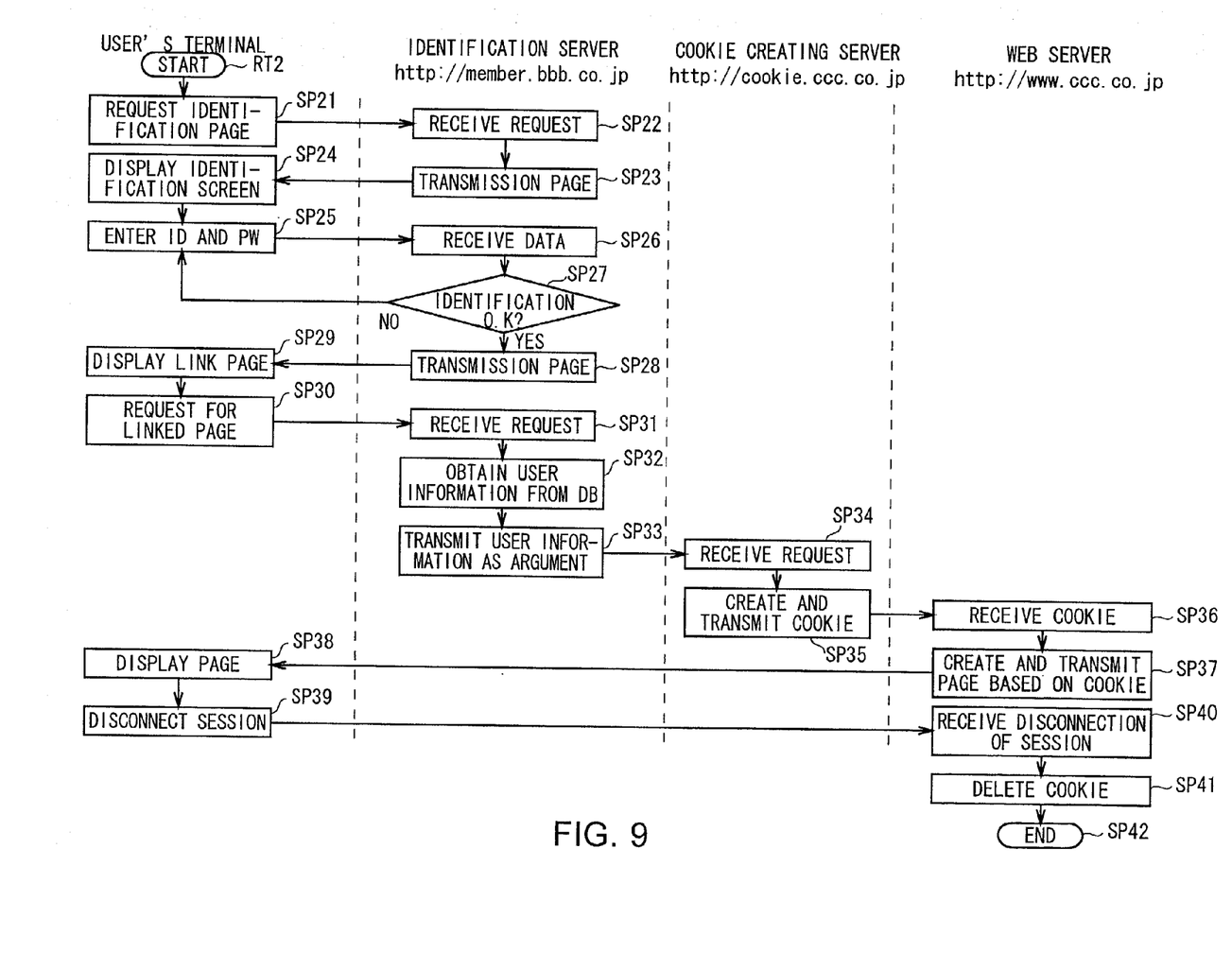
FIG. 9 is a flowchart showing an information providing processing procedure in the second embodiment.

That is, in FIG. 9, the information providing system 31 starts the routine RT2 at starting step, and at step SP21, when the user inputs an access command to the registered user identification page of the information providing system 31, the CPU of the user's terminal 2A transmits a request for taking out the registered user identification page to the identification server 34 accordingly.

At step SP22, when the user identifying section 42 of the identification server 34 receives the request for taking out the registered user identification page, the processing moves to next step SP23.

At step SP23, the user identifying section 42 of the identification server 34 takes out HTML data of the registered user identification page from the hard disk drive of the identification server 34 and transmits it to the user's terminal 2.

At step SP24, when the CPU of the user's terminal 2A receives the HTML data of the registered user identification page transmitted from the identification server 34, displays the registered user identification screen 200 (FIG. 5) based on the HTML data and the process moves to next step SP25.

At step SP25, when the user inputs the user ID and password on the registered user identification screen 200, the CPU of the user's terminal 2A transmits the inputted user ID and password to the identification server 34.

At step SP26, when the user identifying section 42 of the identification server 34 receives the user ID and password transmitted from the user's terminal 2, the process moves to next step SP27.

At step SP27, the user identifying section 42 of the identification server 34 compares the user ID and password, which are transmitted from the user's terminal 2, with the user ID and password written in the user identification table 101 (FIG. 3B) in the user identification database 44 to judge whether or not the access from the user's terminal 2A has made by the registered user.

Obtaining a negative result at step SP27 means that the user ID and password transmitted from the user's terminal 2A are not the same as the user ID and password written in the user identification table 100, that is, the access from the user's terminal 2A has not made by the registered user. At this time, the user identifying section 42 of the identification server 34 transmits a request for inputting the user ID and password again to the user's terminal 2. The CPU of the user's terminal 2A returns to step SP25 when receiving the re-inputting request, and transmits the re-inputted user ID and password to the identification server 34.

On the contrary, obtaining an affirmative result at step SP27 means that the user ID and password transmitted from the user terminal 2A are the same as the user ID and password written in the user identification table 100, that is, the access from the user terminal 2A has made by the registered user. At this time, the user identifying section 42 of the identification server 34 moves to next step SP28.

At step SP28, the user identifying section 42 of the identification server 34 takes out HTML data of a linked page for registered users which is a page linked to the web pages for registered users provided by the web site for registered users 33, and transmits it to the user's terminal 2.

At step SP29, when the CPU of the user's terminal 2A receives the HTML data of the linked page for registered users transmitted from the identification server 34, it displays the linked screen for registered users 201 (FIG. 6) based on the HTML data on the display and moves to next step SP30.

At step SP30, when the user clicks any of linked item display areas 201A to 201E on the linked screen for registered users 201 using the mouse, the CPU of the user's terminal 2A transmits a request for taking out a linked web page (a page for registered users) corresponding to the clicked linked item display area to the identification server 34.

At step SP31, when the user information management section 43 of the identification server 34 receives the request for taking-out the linked web page transmitted from the user's terminal 2 via the data transmitter/receiver 41, the process moves to next step SP32.

At step SP32, the user information management section 43 of the identification server 34 takes out the user information about the registered user which has transmitted the taking-out request, from the user information table 100 (FIG. 3A) of the user information database 45, and moves to next step SP33.

At step SP33, the user information management section 43 of the identification server 34 adds the taken-out user information to the request for taking out a linked web page as argument, and transmits the resultant to the cookie creating server 35.

At step SP34, when the cookie creating section 47 of the cookie creating server 35 receives the taking-out request transmitted from the identification server 34, the process moves to next step SP35.

At step SP35, the cookie creating section 47 of the cookie creating server 35 creates a cookie based on the argument (that is, user information) added to the received taking-out request, and transmits it together with the taking-out request to the web server 36.

At step SP36, when the service providing section 49 of the web server 36 receives the cookie and the taking-out request transmitted from the cookie creating server 35, the process moves to step SP37.

At step SP37, the service providing section 49 of the web server 36 creates HTML data of a web page for registered user suitable for the user's hobbies based on the received cookie and transmits it to the user's terminal 2.

At step SP38, when the CPU of the user's terminal 2A receives the HTML data of the web page for the registered users transmitted from the web server 36, it displays the web page for registered users on the display based on the HTML data and moves to next step SP39.

At step SP39, when the user terminates the web browser program, the CPU of the user's terminal 2A transmits the session disconnect request to the web server 36 accordingly.

At step SP40, when the service providing section 49 of the web server 36 receives the session disconnect request transmitted from the user's terminal 2, it moves to next step SP41.

At step SP41, the service providing section 49 of the web server 36 deletes the cookie received from the cookie creating server, and moves to next step SP42 where the processing is terminated.

As described above, in the information providing system 31, the identification server 34 transmits usr information about a registered user as argument of the taking-out request to the cookie creating server 35 which creates a cookie based on the user information and supplies it to the web server 36. Then, the web server 36 customizes a web page for registered users based on the cookie supplied from the cookie creating server 35 and supplies it to the user's terminal 2A.

In the aforementioned configuration, the identification server 34 identifies a user who has accessed using the user's terminal 2A, and when the access has made by a registered user, it supplies a linked page for registered users which is a page linked to web pages for registered users provided by the web site for registered users 33, to the user's terminal 2A.

Then, when the identification server 34 receives the request for taking out a web page for registered users from the user's terminal 2, it transmits the user information about the registered user as argument to the cookie creating server 35. The cookie creating server 35 creates a cookie based on the user information and supplies it to the web server 36.

The web server 36 customizes a web page for registered users based on the user's hobbies, based on the cookie transmitted from the cookie creating server 35, and transmits it to the user's terminal 2A.

Thus, in the information providing system 31, web pages for registered users customized based on the registered user's hobbies can be provided, using the cookie created based on the user information about the registered user.

Here, it can be considered that the cookie creating section 47 is provided in the identification server 34 which creates a cookie and transmits it to the web server 36, like the identification server 5 of the first embodiment.

However, according to the world wide web (WWW) standards, in general, a creator (that is, server) of a cookie creates only a cookie in the own domain. Therefore, the identification server 34 can create only a cookie in the domain (http://bbb.co.jp) of the identification server 34, so that the web site for registered users 33 (http://ccc.co.jp) can not utilize the cookie created by the identification server 34.

On the other hand, in the information providing system 31 of the second embodiment in the present invention, the identification server 34 transmits user information about a registered user as argument of the taking-out request to the cookie creating server 35 which creates the cookie based on the argument (that is, user information) and supplies it to the web server 36, so that the registered user can see web pages for registered users customized based on the own user information even the identification server 34 and the web server 36 are provided in the separate domains.

Therefore, in the information providing system 31, even in the case where a registered user makes an access with a user terminal 2B to 2N possessed by another person or a user terminal 2B to 2N shared in his office, he can accurately see web pages for registered users customized based on his own user information.

According to the above configuration, user information about each registered user is stored in the user information database 45, the user information is transmitted as argument of a taking-out request to the cookie creating server 35 which creates a cookie based on the argument and supplies it to the web server 36, so that the user can always see web pages for registered users customized based on the own user information even the identification server 34 and the web server 36 are provided in the separate domains, regardless of the user's terminal 2A to 2N the user uses.

(3) Other Embodiments

Note that, the foregoing first embodiment has described the case where one web server 6 is provided in the web site for registered users 3. The present invention, however, is not limited to this and a plurality of web servers 6 can be provided in the web site for registered users 3 and the identification server 5 can supplies a cookie to each web server 6.

Similarly, the foregoing second embodiment has described the case where one identification site 32 and one web site for registered users 33 are provided. The present invention, however, is not limited to this and a plurality of web sites for registered users 33 can be provided and the identification server 34 can provide the user information to each web site for registered users 33.

In addition, the foregoing first and second embodiments have described the case where a plurality of users' terminals 2A to 2N are provided and the users see web pages for registered users using any of the plurality of users' terminal 2A to 2N. The present invention, however, is limited to this and one user's terminal 2 can be provided and a plurality of users can share the user's terminal 2 to see web pages for registered users. In this case, also, a user can always see web pages for registered users customized based on his own user information, using a cookie created based on his own user information.

Further, the foregoing first and second embodiments have described the case where the CPUs of the identification servers 5 and 34, the web servers 6 and 36, and the cookie creating server 35 perform the foregoing information providing processing in accordance with programs stored in the hard disk drive. The present invention, however, is not limited to this and programs can be stored in any of various program storage media and installed in each server using the program storage medium to perform the foregoing information providing processing.

As a program storage medium for installing aforementioned programs in each server so as to drive them by the server, not only package media including a floppy disk, a digital video disc-read only memory (DVD-ROM) but also a semi-conductor memory and a magnetic disc for temporary or permanently storing programs can be used. Further, as a means for storing programs in a program storage medium, wired or radio communication media such as a local area network, the Internet or digital satellite broadcasting can be used and also, the programs can be stored via another interface such as a router or a modem.

As described above, according to the present invention, control information is created based on user information about a user identified by the user identifying means and provision information is created based on the control information, so that provision information suitable for user information about the user can be always provided regardless of a user's terminal the user uses.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information providing system comprising a user identifying device and an information providing apparatus, wherein:
    said user identifying device comprises:
        user identifying means for identifying a user based on a password inputted using a user terminal;
        user information storage means for storing personal user information related to the identified user;
        user information taking-out means for taking out at least a portion of the personal user information from prescribed said user information storage means;
        control information creating means for creating control information based on said personal user information taken out by said user information taking-out means;
        link data transmitting means for transmitting link address data for accessing said information providing apparatus to said user terminal; and
        transmitting means for transmitting, when a request for access to information stored on said information providing apparatus using said link address data is received from said user terminal, said control information from said control information creating means to said information providing apparatus without sending the control information to said user terminal, and
    said information providing apparatus comprises:
        receiving means for receiving said control information from said user identifying device; and
        provision information supplying means for creating provision information having the contents corresponding to said personal user information based on said control information and supplying said provision information to said user terminal.

2. The information providing system according to claim 1, wherein said control information is a cookie.

3. An information providing system comprising a user identifying device, a control information creating device and an information providing apparatus, wherein:
    said user identifying device comprises:
        user identifying means for identifying a user based on a password inputted using a user terminal;
        user information storage means for storing personal user information related to the identified user;
        user information taking-out means for taking out at least a portion of the personal user information from the user information storage means; and
        link data transmitting means for transmitting link address data for accessing said information providing apparatus to said user terminal, and
    said control information creating device comprises:
        control information creating means for creating control information based on said personal user information taken out by said user information taking-out means; and
        transmitting means for transmitting, when a request for access to information stored on said information providing apparatus using said link address data is received from said user terminal, said control information from said control information creating means to said information providing apparatus without sending the control information to said user terminal, and
    said information providing apparatus comprises:
        receiving means for receiving said control information from said user identifying device; and
        provision information supplying means for creating provision information having contents corresponding to said personal user information based on said control information and supplying said provision information to said user terminal.

4. The information providing system according to claim 3, wherein
    said control information creating means and said provision information supplying means are provided in the same domain.

5. An information providing apparatus, comprising:
    user identifying means for identifying a user based on a password inputted using a user terminal via network;
    user information storage means for storing personal user information related to the identified user;
    user information taking-out means for taking out at least a portion of the personal user information from the user information storage means;
    control information creating means for creating control information based on said personal user information taken out by said user information taking-out means;
    link data transmitting means for transmitting link address data for accessing an information providing apparatus to said user terminal; and
    transmitting means for transmitting, when a recluest for access to information stored on said information providing apparatus using said link address data is received from said user terminal, said control information from said control information creating means to said information providing apparatus without sending the control information to said user terminal, said information providing apparatus creating provision information having the contents corresponding to said personal user information of said user based on said control information and supplies said provision information to said user terminal.

6. The information providing apparatus according to claim 5, wherein
    said control information is a cookie.

7. The information providing apparatus according to claim 5, wherein
    at least said control information creating means and said provision information supplying means are provided in the same domain.

8. An information providing method, comprising:
    a user identifying step of identifying a user based on a password inputting using a user terminal via network;
    a user information storing step of storing personal user information related to the identified user;
    a user information taking-out step of taking out at least a portion of the personal user information from said user information;
    a control information creating step of creating control information in a user identifying device based on said personal user information taken out by said user information taking-out step;
    a link data transmitting step of transmitting link address data for accessing an information providing apparatus to said user terminal; and
    a transmitting step of transmitting, when a request for access to information stored on said information providing apparatus using said link address data is received from said user terminal, said control information from said user identifying device to an information providing apparatus without sending the control information to said user terminal, the information providing apparatus creating provision information having contents corresponding to said personal user information of said user based on said control information and supplies said provision information to said user terminal.

9. The information providing means according to claim 8, wherein said control information is a cookie.

10. A program storage means for making an information processing apparatus execute a program, said program comprising:

a user identifying step of identifying a user based on a password inputted using a user terminal via network;

a user information storing step of storing personal user information related to the identified user;

a user information taking-out step of taking out at least a portion of the personal user information from said user information;

a control information creating step of creating control information in a user identifying device based on said personal user information taken out by said user information taking-out means;

a link data transmitting step of transmitting link data for accessing an information providing apparatus to said user terminal; and a transmitting step of transmitting, when a request for access to information stored on said information providing apparatus using said link address data is received from said user terminal, said control information from said user identifying device to an information providing, apparatus without sending the control information to said user terminal, said information providing apparatus creating provision information having contents corresponding to said personal user information of said user based on said control information and supplies said provision information to said user terminal.

11. The program storage means according to claim 10, wherein said control information is a cookie.

* * * * *